US008964438B2

(12) United States Patent  
Harrison

(10) Patent No.: US 8,964,438 B2  
(45) Date of Patent: Feb. 24, 2015

(54) POWER CONVERTER WITH HOLD UP

(75) Inventor: Michael John Harrison, Petaluma, CA (US)

(73) Assignee: Eaton Industries Company, Christchurch (NZ)

( * ) Notice: Subject to any disclaimer, the term of this patent is extended or adjusted under 35 U.S.C. 154(b) by 278 days.

(21) Appl. No.: 13/510,766

(22) PCT Filed: Nov. 11, 2010

(86) PCT No.: PCT/NZ2010/000223  
§ 371 (c)(1),  
(2), (4) Date: May 18, 2012

(87) PCT Pub. No.: WO2011/062508  
PCT Pub. Date: May 26, 2011

(65) Prior Publication Data  
US 2012/0268098 A1 Oct. 25, 2012

(30) Foreign Application Priority Data  
Nov. 19, 2009 (NZ) ........................................ 581311

(51) Int. Cl.  
*H02M 5/10* (2006.01)  
*H02M 5/297* (2006.01)  
*H02J 7/34* (2006.01)  
*H02J 9/06* (2006.01)

(52) U.S. Cl.  
CPC ............... *H02M 5/297* (2013.01); *H02J 7/345* (2013.01); *H02J 9/061* (2013.01)  
USPC ............................................................. 363/171

(58) Field of Classification Search  
CPC ....................... H02M 2001/0096; H02M 5/10  
USPC ................ 363/157, 159–165, 171–173  
See application file for complete search history.

(56) References Cited

U.S. PATENT DOCUMENTS 5,172,009 A 12/1992 Mohan  
5,198,970 A 3/1993 Kawabata et al.  
(Continued)

FOREIGN PATENT DOCUMENTS

JP 02261058 A 10/1990  
WO WO 98/16985 4/1998  
WO WO 2008/018802 2/2008

OTHER PUBLICATIONS

International Preliminary Report on Patentability Corresponding to International Application No. PCT/NZ2010/000223; Date of Mailing: May 31, 2012; 8 Pages.

(Continued)

*Primary Examiner* — Harry Behm  
*Assistant Examiner* — Matthew Grubb  
(74) *Attorney, Agent, or Firm* — Myers Bigel Sibley & Sajovec, P.A.

(57) ABSTRACT

A power converter providing required hold up for a primary converter, particularly a cycloconverter, without the required hold up capacity by an auxiliary converter including storage capacitors having the requisite capacity. The auxiliary converter may be isolated from the primary converter during normal operation and switched in during power supply discontinuities. The storage capacitors may be charged via a voltage step up circuit to achieve improved charge utilization. The storage capacitors may be charged via a charge path independent of the auxiliary converter output path so that the storage capacitor charging rate may be set independently.

20 Claims, 2 Drawing Sheets

(56) References Cited

U.S. PATENT DOCUMENTS

| | | | |
|---|---|---|---|
| 6,504,497 | B2 | 1/2003 | Jang et al. |
| 7,034,413 | B1 | 4/2006 | Zansky et al. |
| 7,061,212 | B2 | 6/2006 | Phadke |
| 2004/0036361 | A1 | 2/2004 | Dai et al. |
| 2009/0225575 | A1* | 9/2009 | Vinciarelli ............ 363/125 |
| 2009/0244944 | A1 | 10/2009 | Jang et al. |

OTHER PUBLICATIONS

International Search Report, Application No. PCT/NZ2010/000223; Jan. 3, 2012 (3 pages).

Jang et al. "Hold-Up Time Extension Circuit with Integrated Magnetics", *IEEE Applied Power Electronics Conference and Exposition*, Mar. 2005, vol. 1, pp. 219-225.

Lu et al. "A High Frequency ZVS Isolated Dual Boost Converter with Holdup Time Extension Capability", *Power Electronics Specialists Conference*, Jun. 2006, pp. 1-6.

Xing et al. "A Combined Front End DC/DC Converter", *IEEE Applied Power Electronics Conference and Exposition*, Feb. 2003, vol. 2, pp. 1095-1099.

Yang et al. "Range Winding for Wide Input Range Front End DC/DC Converter", *IEEE Applied Power electronics Conference and Exposition*, 2001, vol. 1, pp. 476-479.

* cited by examiner

POWER CONVERTER WITH HOLD UP

RELATED APPLICATIONS

The present application is a 35 U.S.C. §371 national phase application of PCT International Application No. PCT/NZ2010/000223, having an international filing date of Nov. 11, 2010, claiming priority to New Zealand Patent Application No. 581311, filed Nov. 19, 2009. The disclosures of each application are incorporated herein by reference in their entireties. The above PCT International Application was published in the English language and has International Publication No. WO 2011/062508.

FIELD OF THE INVENTION

The present invention relates to a power converter including an auxiliary converter providing additional hold up capacity. More particularly, but not exclusively, the present invention relates to a power converter in which an auxiliary converter provides required hold up for a cycloconverter.

BACKGROUND OF THE INVENTION

Power converters are required to provide an output power supply with first characteristics from an input power supply with different characteristics —typically a high voltage AC supply is transformed to a lower voltage DC supply.

In some applications, such as data centers, minimum "hold up" times are required so that during input power supply discontinuities power continues to be supplied at the output of a converter.

Cycloconverters are very efficient but have minimal charge storage capability,

One approach to achieve hold up is to provide storage capacitors on the DC output of a converter. This requires, large storage capacitors to provide the required hold up as the stored charge cannot be utilized below a certain voltage level making this solution bulky and expensive.

U.S. Pat. No. 7,034,413 discloses a DC side hold up extension circuit in which a capacitor charged from a DC bridge is normally isolated from the DC/DC converter but can be switched in during loss of power supply. This approach also has limited. utilization of the charge stored in the storage capacitor.

U.S. Pat. No. 7,034,413 discloses a circuit in which a rechargeable battery is used to provide. hold up during loss of power supply. Batteries suffer from a slow recharge rate and require periodic replacement. Batteries also require specific charging circuits to ensure they are correctly charged.

Another approach disclosed in "Range winding for wide input range front end dc/dc converter," by B. Yang, P. Xu, and F. C. Lee, in Proc. IEEE Applied Power Electron. Conf., 2001, pp. 476-479 is to switch the output of a converter between input windings of an output transformer having different numbers of turns. This approach results in abrupt output voltage changes when switching between windings.

U.S. Pat. No. 6,504,497 discloses a circuit employing an additional DC/DC boost-type converter utilized when hold up is required. This approach requires additional components, increasing cost, and an additional energy storage inductor having a detrimental effect on power density.

Two stage converters may have sufficiently large storage capacitors to provide required hold up times but they are inefficient due to losses or the two stages and require large storage capacitors to provide the necessary hold up. "Hold-up time extension circuit with integrated magnetics", by Y. Sang, M. Jovanovic and D. L. Dillman, IEEE Applied Power Electronics Conference Record, pp. 219-225, 2005 is an example of a two stage converter using a boost output stage that operates in a different mode during loss of power supply to provide improved hold up time. The additional power stage and control components results in increased cost and a loss of efficiency.

It would be desirable to provide a power converter providing required hold up that is efficient, compact and inexpensive or which at least provides a useful choice.

SUMMARY OF THE INVENTION

According to one exemplary embodiment there is provided a power converter including:
  a. a cycloconverter having a switching stage and an output transformer;
  b. an auxiliary converter including one or more storage capacitors for storing sufficient charge to provide power output hold up during input power supply discontinuities,
  wherein during discontinuity of input power supply to the power converter the auxiliary converter supplies power from the one or more storage capacitors to the output transformer to Maintain power output.

According to another exemplary embodiment there is provided a power converter comprising:
  a. a primary AC/AC converter having restricted hold up capacity including a switching stage and an output transformer; and
  b. an auxiliary converter including one or more power storage capacitors charged via a voltage step up arrangement at a voltage higher than the voltage of the switching stage of the primary converter,
  wherein during discontinuity of input power supply to the power converter the auxiliary converter supplies power from the one or more storage capacitors to the output transformer to maintain power output.

The power converter may include a voltage step up charging circuit which charges the one or more storage capacitors. The voltage step up charging circuit may include a step up transformer in parallel with the output transformer or a winding overwound on the output transformer.

According to a further exemplary embodiment there is provided a power converter comprising:
  a. a primary AC/AC converter having restricted hold up capacity including a switching stage and an output transformer; and
  b. an auxiliary converter including one or more storage capacitors for storing sufficient charge to provide power output hold up via an auxiliary power supply path during input power supply discontinuities,
  wherein the one or more storage capacitors are charged via a charging path independent of the auxiliary power supply path and during discontinuity of input power supply to the power converter the auxiliary converter supplies power from the one or more storage capacitors via the auxiliary power supply path to the output transformer to maintain power output.

The auxiliary converter may include a charging path independent of a path supplying power from the auxiliary converter to the output transformer. An impedance may be provided in the charging path of the auxiliary converter to set a desired charging rate and limit the load on the primary converter. The impedance maybe essentially resistive, inductive, capacitive or composite.

The auxiliary converter may include an output circuit that is isolated from the primary converter and output transformer other than during power supply discontinuities. The output circuit may include a switch and an isolating device in series with a storage capacitor. The output circuit includes two parallel circuits each including a switch and an isolating device in series with a storage capacitor arranged to provide alternating current to the output transformer. Each switch is preferably a field effect transistor. The isolating device is preferably a diode in back to back configuration with the body diode of the field effect transistor. The diode is preferably a slow switching diode such that the auxiliary converter may perform ZVT switching at its frequency of operation.

The switching frequency of the auxiliary converter is preferably controlled at least in part by voltage feedback based on the output voltage of the converter.

The operating frequency of auxiliary converter is preferably based at least in part or the input to output voltage ratio of the primary converter and/or the voltage level of each storage capacitor and/or the load power demand on the output transformer.

The auxiliary converter is preferably a buck converter.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
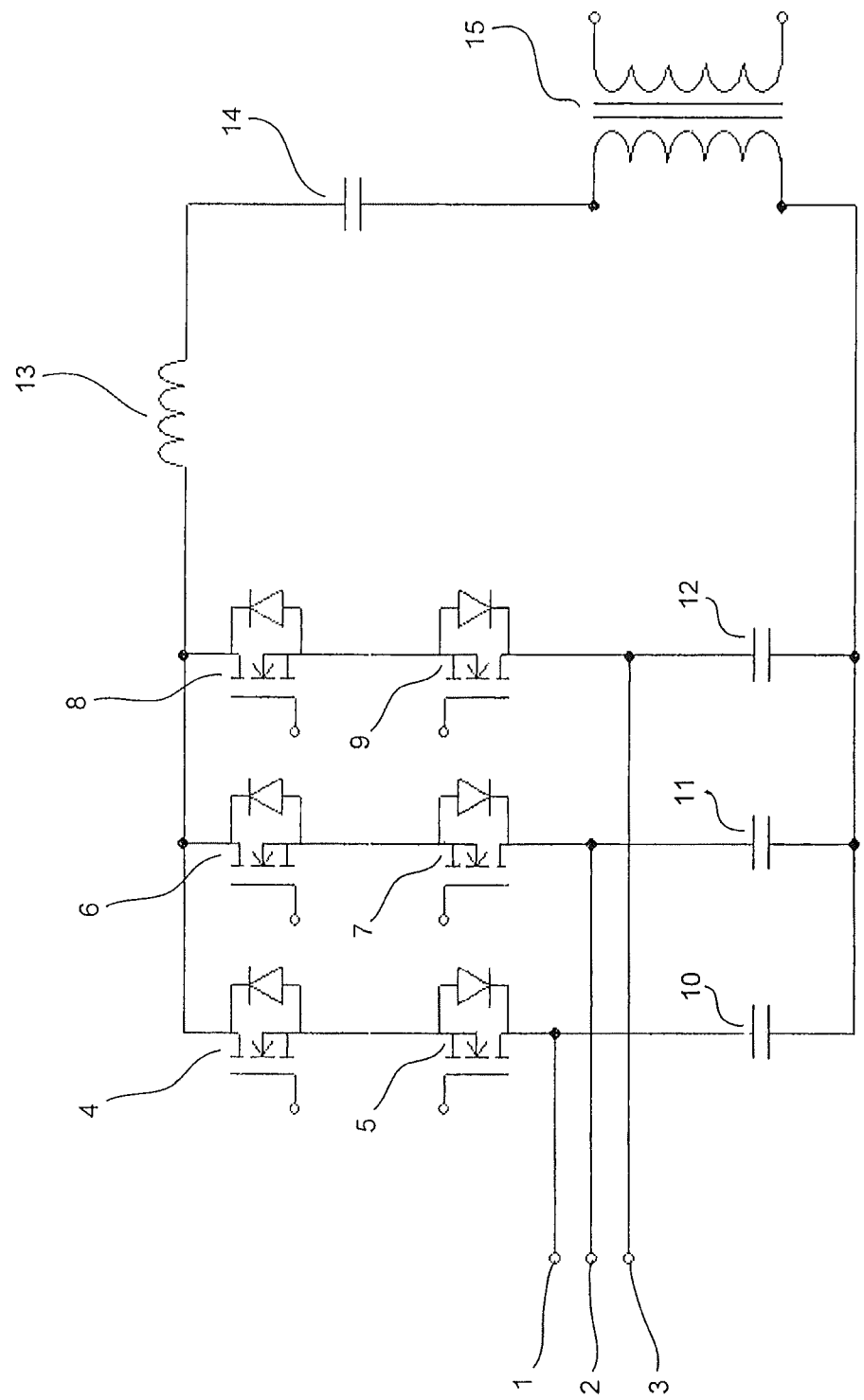
FIG. 1 shows a basic cycloconverter circuit.

FIG. 1 shows a circuit for a conventional cycloconverter in which three phase supply lines 1, 2 and 3 are connected to a bridge consisting of FETs 4 to 9 and capacitors 10 to 12. the output of the bridge Passes through inductor 13 and capacitor 14 to output transformer 15. The converter is an LLC resonant converter having two resonant operating frequencies; one defined by capacitor 14 and inductor 13 and the other by capacitor 14 and the sum of inductor 13 and transformer 15. As the load increases the resonant frequency increases. The LLC resonant converter offers the advantages of narrow frequency variation over wide load and input variation and Zero Voltage Switching (ZVS) of the switches for entire load range.

Capacitors 10 to 12, are sized to allow cycloconverter operation whilst input supply voltage to supply lines 1 to 3 is maintained within normal supply parameters. Where hold up is required for any significant period of time (10 ms is typically required for data centers) additional charge storage is required. The applicant's prior application PCT/NZ07/000165, the disclosure of which is herein incorporated by reference, discloses the detail of preferred cycloconverter designs.

Figure 2:
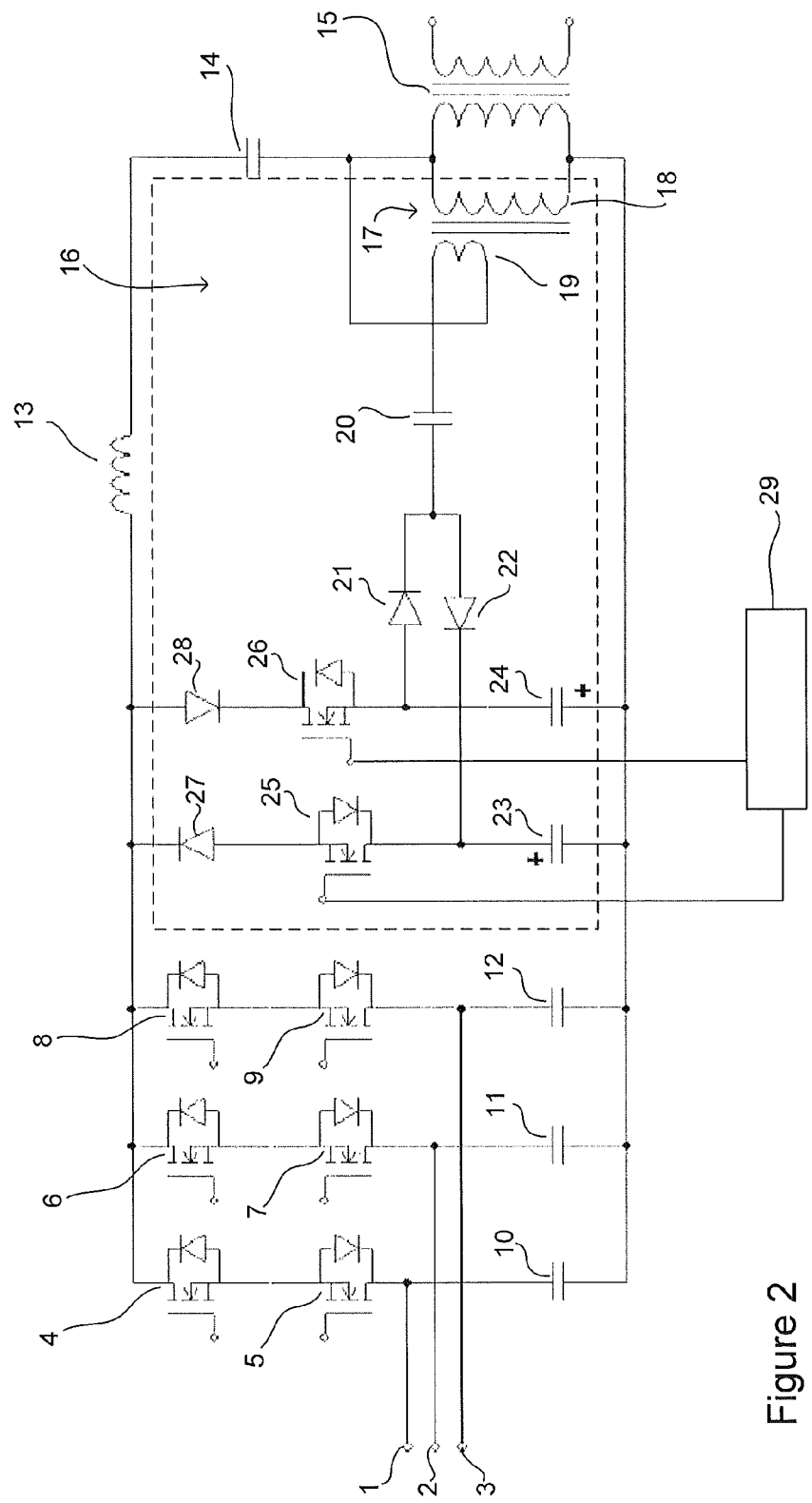
FIG. 2 shows a power converter including a cycloconverter and an auxiliary converter.

FIG. 2 shows a circuit diagram in which an auxiliary, converter 16 (within the dashed box) in the form of a buck converter is included to provide hold up during loss of input power to the primary converter. In this case the primary converter is a cycloconverter although it will be appreciated that the auxiliary converter may be used in conjunction with other primary converter topologies.

FIG. 2 shows a full wave auxiliary converter 16, the output of which is isolated from the cycloconverter and output transformer 15 during normal input power supply to the cycloconverter. In this embodiment transformer 17 is connected in parallel with output transformer 15 and the turns ratio of turns 18 to turns 19 of transformer 17 may be selected to charge capacitors 23 and 24 as will be described. Instead of utilizing a separate transformer winding 19 could be overwound on transformer 15. Capacitors 23 and 24 are charged via a charging path independent of the output path of auxiliary converter 16 via capacitor 20 and diodes 21 and 22. Controlling charging via 2 charging path independent of the output path prevents excessive inrush current to capacitors 23 and 24 which may otherwise hold down the primary converter output at start up. Capacitor 20 could be any impedance and controls the charge rate of capacitors 23 and 24. If a resistor is substituted for capacitor 20 then resistance losses will be incurred. A frequency dependant impedance has the advantage of lower losses and that the charging rate may vary with cycloconverter switching frequency. Whilst an inductance would have the most desirable frequency dependency this would incur the cost and size of an additional inductive element. A capacitor has the advantage of low losses, small size and low cost. A compound impedance may also be utilised. The size of the impedance, in this case capacitor 20, is set such that capacitors 23 and 24 are charged within an acceptable period and an undue load is no placed on the cycloconverter.

The turns ratio of windings 18 and 19 of transformer 17 are preferably set so that capacitors 23 and 24 are charged to a level well above the normal output voltage of the cycloconverter supplied to transformer 15. In this way auxiliary converter 16 may better utilize the charge stored in capacitors 23 and 24.

The blocking diodes of FETs 25 and 26 are opposed to diodes 27 and 28 so that capacitors 23 and 24 are isolated from the cycloconverter and output transformer 15 when the FETs 25 and 26 are switched off. Where there is a discontinuity of the input power supply to power supply lines 1 to 3 the charge stored in capacitors 23 and 24 may be supplied via FETs 25 and 26 and diodes 27 and 28 to output transformer 15 to maintain the output supply from the power converter. Control circuit 29 monitors the input power supply and when a discontinuity in supply is detected control circuit 29 controls the switching of FETs 25 and 26 so that the charge stored in capacitors 23 and 24 is used to maintain output supply. Control circuit 29 switches FETs 25 and 26 at a relatively high frequency (about 100 kHz) during operation of the auxiliary converter to provide a high frequency AC output voltage to output transformer 15. Diodes 27 and 28 are selected to have a slow switching speed relative to the switching speed of FETs 25 and 26 so that after a FET 25 or 26 has been conductive the associated diode 27 or 28 remains on when the other FET is switched on so as to enable zero voltage switching (ZVS). For example if FET 25 is initially switched on diode 27 becomes conductive and charge from capacitor 23 is supplied to output transformer 15. When FET 25 is switched off diode 27 is slow to turn off and remains conductive when FET 26 switched on so that a conductive path remains via diode 27 and the blocking diode of FET 25 so that ZVS switching may be performed. In this way the output of the auxiliary converter may be isolated during normal operation but diodes 27 and 28 are essentially conductors during operation of the auxiliary converter to allow ZVS switching. This arrangement also has the advantage of using relatively inexpensive slow switching diodes 27 and 28.

Control circuit 29 incorporates feedback control to control the output of the power converter during operation of the auxiliary converter. Control circuit 29 monitors the output voltage of the power converter at the output of transformer 15 and controls the frequency of switching of FETs 25 and 26 to produce the required output voltage based on the transfer function of the LLC circuit.

To reduce a drop in output voltage of the power converter at start up of the auxiliary converter control circuit 29 may include feed forward control also Control circuit 29 may monitor the input to output voltage ratio of the cycloconverter; the voltage levels of capacitors 23 and 24 and the load power demand (output voltage and current) on the output transformer 15. Control circuit 29 may set the initial frequency of operation of the auxiliary converter using feed forward control based on these parameters and subsequently operate based on feedback control.

Whilst a full wave auxiliary converter is shown in FIG. 2 it will be appreciated that a half wave converter could be produced simply by eliminating one branch of the auxiliary converter 16 (e.g. delete diode 21, capacitor 24, FET 26 and diode 28).

There is thus provided a power converter utilizing an auxiliary converter to provide required hold up having the following advantages:

i. Lower rated storage capacitors are required due to the effective charge utilization achieved by charging the capacitors to an elevated voltage;
ii. An integrated solution is provided utilizing the primary converter output stage;
iii. No additional storage inductor is required;
iv. Low cost implementation due to low part count and use of low cost components, such as slow diodes 27 and 28 and storage capacitors 23 and 24;
v. Low load on primary converter during start up due to independent charge path;
vi. ZVT switching enabled through use of slow diodes 27 and 28.

While the present invention has been illustrated by the description of the embodiments thereof, and while the embodiments have been described in detail, it is not the intention of the Applicant to restrict or in anyway limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A power converter comprising:
a primary AC/AC converter having restricted hold up capacity including a switching stage and an output transformer; and
an auxiliary converter including one or more storage capacitors for storing sufficient charge to provide power output hold up via an auxiliary power supply path during input power supply discontinuities,
wherein the one or more storage capacitors are charged via a charging path independent of the auxiliary power supply path and during discontinuity of input power supply to the power converter the auxiliary converter supplies power from the one or more storage capacitors via the auxiliary power supply path to the output transformer to maintain power output.

2. A power converter as claimed in claim 1 including a voltage step up charging circuit which charge the one or more storage capacitors.

3. A power converter as claimed in claim 2 wherein the voltage step up charging circuit includes a step up transformer in parallel with the output transformer.

4. A power converter as claimed in claim 2 wherein the voltage step up charging circuit includes a winding overwound on the output transformer.

5. A power converter as claimed in claim 1 wherein an impedance is provided in the charging path of the auxiliary converter to set a desired charging rate and limit the load on the primary AC/AC converter.

6. A power converter as claimed in claim 5 wherein the impedance is essentially resistive.

7. A power converter as claimed in claim 5 wherein the impedance is frequency dependent.

8. A power converter as claimed in claim 7 wherein the impedance is essentially inductive.

9. A power converter as claimed in claim 7 wherein the impedance is essentially capacitive.

10. A power converter as claimed in claim 7 wherein the impedance is a composite impedance.

11. A power converter as claimed in claim 1 wherein the auxiliary converter includes an output circuit that is isolated from the primary converter and output transformer other than during power supply discontinuities.

12. A power converter as claimed in claim 11 wherein the output circuit includes a switch and an isolating device in series with a storage capacitor.

13. A power converter as claimed in claim 12 wherein the output circuit includes two parallel circuits each including a switch and an isolating device in series with a storage capacitor arranged to provide alternating current to the output transformer.

14. A power converter as claimed in claim 11 wherein each switch is a field effect transistor.

15. A power converter as claimed in claim 14 wherein the isolating device is a diode in back to back configuration with the body diode of the field effect transistor.

16. A power converter as claimed in claim 15 wherein the diode is a slow switching diode such that the auxiliary converter may perform ZVT switching at its frequency of operation.

17. A power converter as claimed in claim 1 wherein a switching frequency of the auxiliary converter is controlled at least in part by voltage feedback based on the output voltage of the converter.

18. A power converter as claimed in claim 1 wherein a switching frequency of the auxiliary converter is based at least in part on at least one of the input to output voltage ratio of the primary AC/AC converter, the voltage level of each storage capacitor, and the load power demand on the output transformer.

19. A power converter as claimed in claim 1 wherein the auxiliary converter is a buck converter.

20. A power converter as claimed in claim 1 wherein the primary converter is a cycloconverter.

* * * * *

UNITED STATES PATENT AND TRADEMARK OFFICE
CERTIFICATE OF CORRECTION

PATENT NO.       : 8,964,438 B2
APPLICATION NO.  : 13/510766
DATED            : February 24, 2015
INVENTOR(S)      : Harrison Page 1 of 1

It is certified that error appears in the above-identified patent and that said Letters Patent is hereby corrected as shown below:

In the Specification:
Column 1, Line 65: Please correct "losses or the two"
 to read -- losses of the two --

Signed and Sealed this
Twenty-fifth Day of August, 2015

Michelle K. Lee
*Director of the United States Patent and Trademark Office*